(12) United States Patent
Asano et al.

(10) Patent No.: US 6,336,040 B1
(45) Date of Patent: *Jan. 1, 2002

(54) MOBILE RADIO SYSTEM WITH CONTROL OVER RADIO WAVE OUTPUT IF A MALFUNCTION IS DETECTED

(75) Inventors: Nobuo Asano; Izumi Horikawa, both of Yokohama (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/207,662

(22) Filed: Dec. 9, 1998

Related U.S. Application Data

(63) Continuation of application No. 08/761,552, filed on Dec. 6, 1996, now Pat. No. 5,873,027, which is a continuation of application No. 08/272,159, filed on Jul. 8, 1994, now abandoned.

(30) Foreign Application Priority Data

Jul. 16, 1993 (JP) .............................................. 5-199018

(51) Int. Cl.[7] ................................................. H04Q 7/34
(52) U.S. Cl. ........................ 455/561; 455/117; 455/115; 455/67.3; 455/425
(58) Field of Search .......................... 455/117, 92, 127, 455/522, 67.1, 0.3, 68, 69, 423–425, 561, 115, 528; 330/298

(56) References Cited

U.S. PATENT DOCUMENTS

| | | |
|---|---|---|
| 3,829,782 A | 8/1974 | Dillman et al. ......... 455/127 X |
| 3,958,244 A | 5/1976 | Lee et al. ............... 455/115 X |
| 4,035,727 A | 7/1977 | Ishii ........................... 455/119 |
| 4,878,034 A * | 10/1989 | Gross et al. ................ 330/298 |
| 4,903,193 A | 2/1990 | Nakamura .................... 714/55 |
| 5,265,119 A | 11/1993 | Gilhousen ................... 370/335 |
| 5,398,332 A | 3/1995 | Komoda et al. .............. 714/55 |
| 5,526,528 A * | 6/1996 | Kurisu ........................ 455/117 |
| 5,873,027 A * | 2/1999 | Asano et al. .............. 455/67.3 |

FOREIGN PATENT DOCUMENTS

| | | |
|---|---|---|
| JP | 1-70127 | 7/1989 |
| JP | 3-240328 | 10/1991 |

* cited by examiner

Primary Examiner—William Trost
Assistant Examiner—Philip J. Sobutka
(74) Attorney, Agent, or Firm—Venable; Robert J. Frank; Allen Wood

(57) ABSTRACT

A mobile radio system includes a base station and a plurality of mobile radio apparatuses, with each mobile radio apparatus including a control CPU for controlling the mobile radio apparatus and monitoring the state of the hardware of the mobile radio apparatus, a transmitter unit for transmitting data in the form of radio waves, and a CPU monitor unit. The control CPU regularly monitors and checks for any abnormalities in the hardware of the mobile radio apparatus, and the CPU monitor unit regularly monitors and checks for any abnormalities in the control CPU. If there is an abnormality, a disabled transmission out put acceptance signal is supplied to the transmitter unit to inhibit or suppress the output of radio waves thereby avoiding interference to the system caused by unnecessary radio wave transmission from an abnormal mobile radio apparatus.

6 Claims, 2 Drawing Sheets

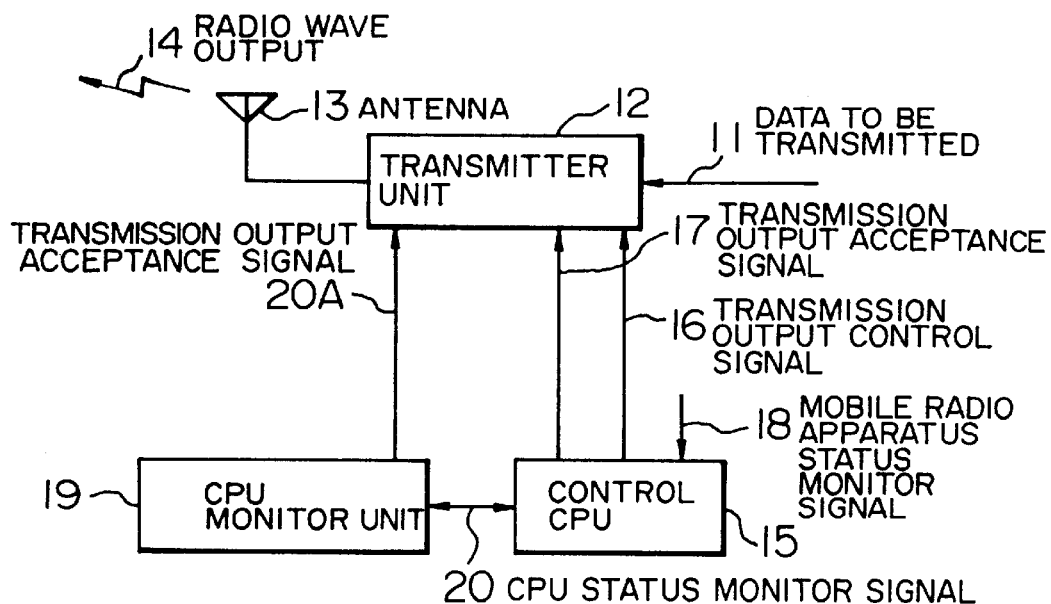
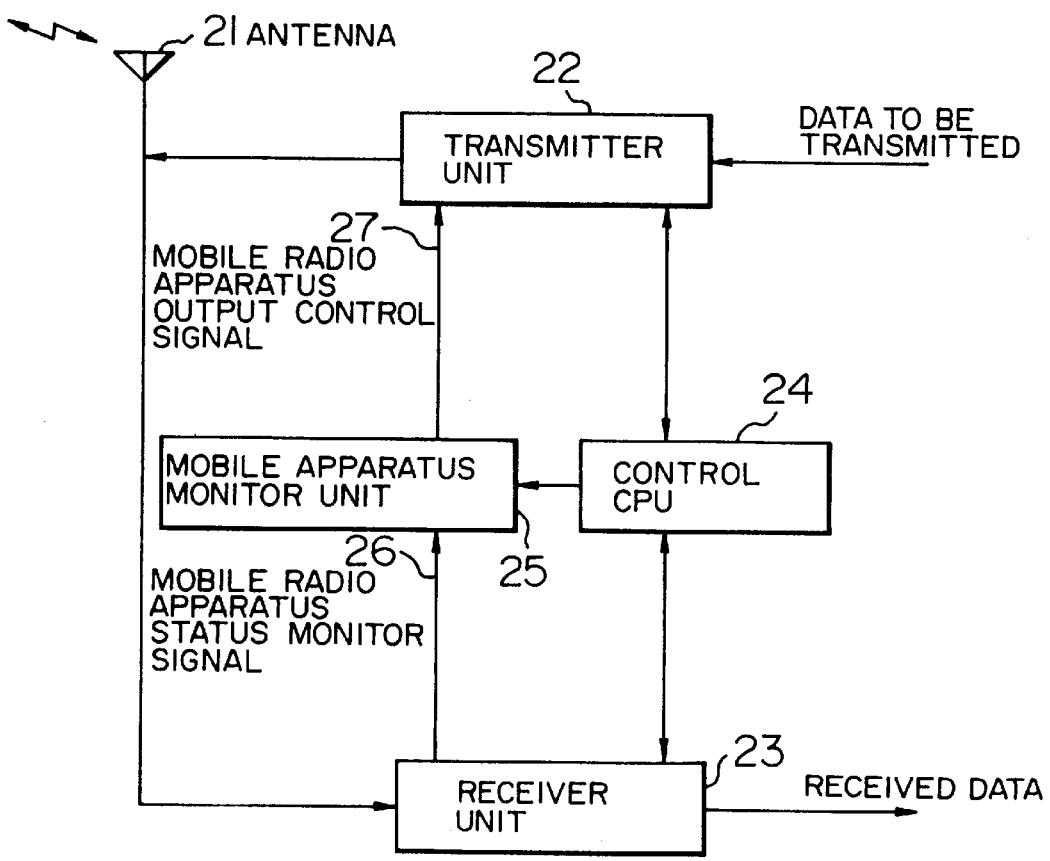

bile radio apparatus to the mobile radio apparatus. It is therefore possible to inhibit or suppress the output of radio waves from the transmitter unit of the mobile radio apparatus, thereby avoiding interference to the system.

MOBILE RADIO SYSTEM WITH CONTROL OVER RADIO WAVE OUTPUT IF A MALFUNCTION IS DETECTED

CROSS REFERENCE TO RELATED APPLICATIONS

The present application is a continuation of application Ser. No. 08/761,552, filed on Dec. 6, 1996, now U.S. Pat. No. 5,873,027 which in turn was a continuation of application Ser. No. 08/272,159, filed on Jul. 8, 1994 (and now abandoned).

BACKGROUND OF THE INVENTION

1. Field of the Invention

The present invention relates to a mobile radio system equipped with means for suppressing an output of interference radio waves in the technical field of mobile radio.

2. Description of the Related Art

FIG. 3 is a schematic diagram showing the structure of a conventional mobile radio transmitter. In FIG. 3, reference numeral 1 represents data to be transmitted, reference numeral 2 represents a transmitter unit, and reference numeral 3 represents an antenna. Data 1 is supplied to the transmitter unit 2 and is modulated and transmitted as a radio wave output 4 from the antenna 3. Reference numeral 5 represents a control CPU which supplies a transmission output control signal 16 to the transmitter unit 2. The transmission output control signal controls the on/off state of transmission, transmission power level, and the like.

The method of controlling a radio wave output of the mobile radio apparatus constructed as indicated above will now be described. Referring to FIG. 3, if there is data 1 to be transmitted, the control CPU 5 controls the transmission on/off state, transmission power level, and the like of a transmission power amplifier and the like in the transmitter unit 2. The data modulated at the transmitter unit 2 is transmitted as the radio wave output 4 from the antenna 1 at a predetermined transmission power level.

In the above-described manner, the control CPU controls the radio wave output of the conventional mobile radio apparatus described above.

With such a conventional mobile radio apparatus, however, if the control CPU controlling the transmission power of the mobile radio apparatus crashes or the hardware of the mobile radio apparatus breaks down, there is a possibility of transmitting radio waves at an unexpected timing or at an unexpected power level. For example, in a mobile radio system using CDMA (code division multiple access), users in one area are assigned the same carrier. Therefore, the radio wave output of one mobile radio apparatus may become an interference to an other mobile radio apparatus. It is therefore necessary for each mobile radio apparatus to control its transmission power correctly. If a mobile radio apparatus transmits its radio wave output at a power level larger than the predetermined level, another mobile radio apparatus may possibly be interfered with by the high power radio wave output. In such a case, the number of users in one area must be reduced. The mobile radio system may become unable to operate if a mobile radio apparatus become defective and transmits too large a radio wave output.

The above-described problems are also associated with parent-child communication system (JP-A-3-240328) in which any abnormality between a parent apparatus and a child apparatus is monitored.

SUMMARY OF THE INVENTION

The present invention solves the above-described problems of the prior art and aims at providing an excellent mobile radio system capable of stopping or suppressing a radio wave output when an abnormality of a mobile radio apparatus is detected.

In order to achieve the above object, the mobile radio apparatus of a mobile radio system of the invention includes a CPU for controlling the mobile radio apparatus and monitoring the status of the hardware of the mobile radio apparatus, a transmitter unit for transmitting data in the form of radio waves, and a CPU monitor unit, wherein the CPU regularly monitors and checks for any abnormalities in the hardware of the mobile radio apparatus, the CPU monitor unit regularly monitors and checks for any abnormalities in the CPU, and if one of the CPU and CPU monitor unit detects an abnormality, a signal for inhibiting or suppressing the radio wave output is supplied to the transmitter unit.

Furthermore, a base station of the mobile radio system of the invention includes means for transmitting a signal for inhibiting or suppressing the radio wave output to a mobile radio apparatus when the base station detects that the mobile radio apparatus is abnormal.

According to the present invention, the CPU controlling a mobile radio apparatus regularly monitors and checks for abnormalities in the hardware of the mobile radio apparatus, and the CPU monitor unit regularly monitors and checks for abnormalities in the CPU. Therefore, if one of the hardware of the mobile radio apparatus and the CPU becomes abnormal, the radio wave output of the transmitter unit is inhibited or suppressed so that interference to the system can be avoided.

Furthermore, according to the present invention, if the base station detects an abnormality in a mobile radio apparatus, it transmits a signal like the signal supplied from the CPU or CPU monitor unit to the transmitter unit of the mobile radio apparatus, to the mobile radio apparatus. It is therefore possible to inhibit or suppress the output of radio waves from the transmitter unit of the mobile radio apparatus, thereby avoiding interference to the system.

BRIEF DESCRIPTION OF THE DRAWINGS

FIG. 1 is a schematic block diagram showing the structure of a transmitter unit of a mobile radio apparatus according to a first embodiment of the present invention.

FIG. 2 is a schematic block diagram showing the structure of a transceiver unit at a base station according to a second embodiment of the present invention.

DESCRIPTION OF THE PREFERRED EMBODIMENTS

1st Embodiment

Figure 3:
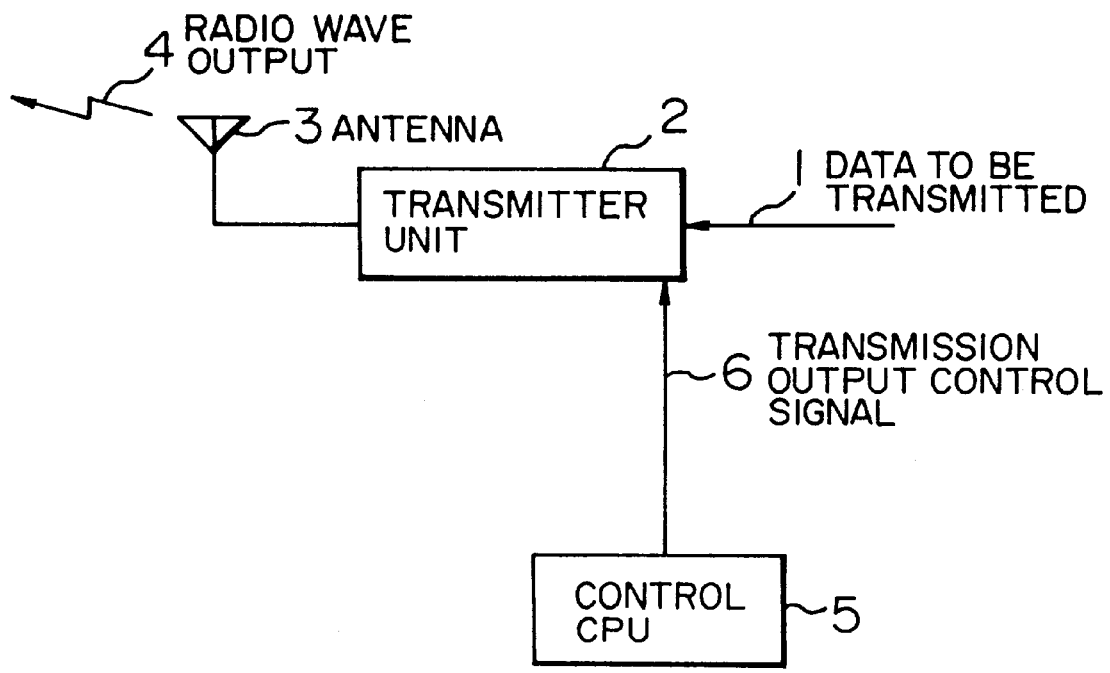
FIG. 3 is a schematic block diagram showing the structure of a transmitter unit of a conventional mobile radio apparatus.

FIG. 1 shows an outline of the structure of a transmitter unit of a mobile radio apparatus according to the first embodiment of the invention. In FIG. 1, reference numeral 11 represents data to be transmitted, reference numeral 12 represents a transmitter unit, and reference numeral 13 represents an antenna. Data 11 is supplied to the transmitter unit 12 and is modulated and transmitted as a radio wave output 14 from the antenna 13. Reference numeral 15 represents a control CPU which supplies a transmission output control signal 16 to the transmitter unit 12. The transmission output control signal 16 control the on/off state of transmission, the transmission power level, and the like. Reference numeral 17 represents a transmission output acceptance signal supplied from the control CPU 15, and reference numeral 18 represents a mobile radio apparatus status monitor signal. Reference numeral 19 represents a CPU monitor unit, reference numeral 20 represents a CPU status monitor signal which is transferred between the control CPU 15 and the CPU monitor unit 19, and reference numeral 20A represents another transmission output acceptance signal supplied from the CPU monitor unit 19.

The method of controlling a radio wave output of the transmitter unit of the mobile radio apparatus constructed as indicated above will now be described. Referring to FIG. 1, if there is data 11 to be transmitted, the control CPU 15 controls the transmission on/off state, transmission power level, and the like of a transmission power amplifier and the like in the transmitter unit 12 in the normal state. The data modulated at the transmitter unit 12 is transmitted as a radio wave output 14 from the antenna 11 at a predetermined transmission power level. During data transmission, the control CPU 15 monitors the mobile radio apparatus status monitor signal 18 to check for any abnormality in the status of the hardware of the mobile radio apparatus. The CPU monitor unit 19 monitors the CPU status signal 20 to check for any abnormality of the status of the control CPU 15. The CPU monitor unit 19 is typically a watch dog timer. The control CPU 15 and CPU monitor unit 19 monitor each other. If the control CPU 15 detects any abnormality, a disabled transmission output acceptance signal 17 is supplied to the transmitter unit 12 to control or inhibit the radio wave output 14, whereas if the CPU monitor unit 19 detects any abnormality, a disabled transmission output acceptance signal 20A is supplied to an transmitter unit 12 to control or inhibit the radio wave output 14. When such control or inhibition is executed, an error message is displayed on a display panel of the mobile radio apparatus. As a method of controlling or inhibiting the radio wave output of the transmitter unit 12, various methods may be used, such as stopping the power supply to the transmission power amplifier, setting a local frequency so as to modulate the transmission data outside of the frequency range assigned for use and controlling the power level of the transmission data by a BPF at the following stage, or masking the upper bits of the transmission data in a digital communication system before digital-to-analog conversion to control the transmission power level.

According to the first embodiment, if one of the control CPU 15 and CPU monitor unit 19 detects an abnormality in the mobile radio apparatus or the control CPU 15, for example, when the power for the mobile radio apparatus is turned on, the radio wave output of the transmitter unit 12 is inhibited or suppressed so that interference to the system can be avoided.

2nd Embodiment

The second embodiment of the present invention will now be described. In the second embodiment of the invention, a base station inhibits or suppresses the radio wave output of a mobile radio apparatus even if the control by the first embodiment becomes unable to be performed. FIG. 2 shows an outline of the structure of a transmitter unit at a base station. In FIG. 2, reference numeral 21 represents an antenna, reference numeral 22 represents a transmitter unit, reference numeral 23 represents a receiver unit, reference numeral 24 represents a control CPU which controls the transmitter unit 22 and receiver unit 23, and reference numeral 25 represents a mobile radio status monitor unit for monitoring any abnormality of a mobile radio apparatus. Reference numeral 26 represents a mobile radio apparatus status monitor signal which is outputted from the receiver 23 when any abnormality of a mobile radio apparatus is detected from signals received by the receiver unit 23, and reference numeral 27 represents a mobile radio apparatus transmission output control signal which is outputted from the mobile radio apparatus monitor unit 25 to the transmitter unit 22 when an abnormality of a mobile radio apparatus is detected. In response to this signal 27, the transmitter unit 22 transmits a signal for inhibiting or suppressing the radio wave output, to the mobile radio apparatus having the abnormality.

A method of controlling the radio wave output of a mobile radio apparatus which is performed by the transceiver at the base station constructed as discussed above will now be described. When the mobile radio apparatus monitor unit 25 detects from the mobile radio apparatus status monitor signal 26 that data transmitted by a mobile radio apparatus and received from the antenna 21 by the receiver unit 23 has an abnormally large transmission power level, the mobile radio apparatus 25 instructs the transmitter unit 22 to transmit a signal for inhibiting or suppressing the radio wave output, to the mobile radio apparatus. When the signal transmitted from the transmitter unit 22 via the antenna 21 is received by the partner mobile radio apparatus, a disabled transmission output acceptance signal 20A is supplied to the transmitter unit 12, the manner like a first embodiment shown in FIG. 1, to inhibit or suppress the radio wave output by stopping the power supply to the transmission power amplifier or another method.

According to the second embodiment, even if the radio wave output cannot be suppressed on the side of a mobile radio apparatus having an abnormality, this abnormality is detected by the base station, and the base station controls the radio wave output of the mobile radio apparatus so that interference to the system can be minimized.

As will be appreciated from the above embodiments of the invention, the control CPU of a mobile radio apparatus regularly monitors and checks for any abnormalities of the hardware in the mobile radio apparatus, and the CPU monitor unit regularly monitors and checks for any abnormalities in the control CPU. Therefore, if one of the hardware and the control CPU becomes abnormal, the radio wave output of the transmitter unit is inhibited or suppressed so that interference to the system can be avoided.

Furthermore, according to the present invention, if the base station detects an abnormality of a mobile radio station, it transmits a signal for inhibiting or suppressing radio wave output to the mobile radio apparatus. Therefore, even if radio wave output suppress on cannot be performed properly at the mobile radio apparatus, interference to the system can be minimized.

What is claimed is:

1. A base station using CDMA comprising:
    a transmitter unit; and
    a mobile radio status monitor unit for monitoring any abnormality of a mobile radio apparatus,
    wherein said transmitter unit transmits a signal for preventing a radio wave output to said mobile radio apparatus if said mobile radio status monitor unit detects that said mobile radio apparatus is abnormal.

2. The base station using CDMA of claim 1, wherein the base station transmits the signal for preventing the radio wave output of the mobile radio apparatus if the base station detects that the mobile radio apparatus is transmitting at a power level larger than a predetermined level.

3. A base station which uses CDMA for communicating with mobile units which are served by the base station, said base station comprising:
- a transmitter unit to transmit signals to the mobile units;
- a receiver unit to receive signals transmitted by the mobile units; and
- a monitor unit to monitor the signals received by the receiver unit and detect whether any of the mobile units has an abnormality that interferes with the other mobile units which are served by the base station, and if an abnormality is detected, to cause the transmitter unit to transmit a signal for preventing transmission by the abnormal mobile unit so as to avoid the interference.

4. The base station of claim 3, wherein the abnormality is an abnormally high transmission power level.

5. A communication system comprising the base station of claim 3, in combination with the mobile units served by the base station.

6. A base station which uses CDMA for communicating with mobile units which are served by the base station, said base station comprising:
- a transmitter unit to transmit signals to the mobile units;
- a receiver unit to receive signals transmitted by the mobile units; and
- a monitor unit to detect whether the signals transmitted by any of the mobile units to the receiver unit have an abnormally high power level, and if an abnormally high power level is detected, to reduce interference with the other mobile units served by the base station by causing the transmitter unit to transmit a signal for preventing transmission by the mobile station that is transmitting at the abnormally high power level.

* * * * *